United States Patent
Bonaccorso et al.

(10) Patent No.: US 6,557,392 B1
(45) Date of Patent: May 6, 2003

(54) DEVICE FOR CHECKING AND CALIBRATING HIGH PRECISION INCLINOMETRIC SENSORS

(76) Inventors: Alessandro Bonaccorso, Via Vittorie Emanuele Orlando, 1/C, San Giovanni la Punta (IT); Giuseppe Falzone, Piazza San Domenico 21, Catania (IT); Guido Raia, Via Capuana 91, Catania (IT)

( * ) Notice: Subject to any disclaimer, the term of this patent is extended or adjusted under 35 U.S.C. 154(b) by 0 days.

(21) Appl. No.: 09/743,317
(22) PCT Filed: Jun. 25, 1999
(86) PCT No.: PCT/IT99/00188
§ 371 (c)(1), (2), (4) Date: Sep. 21, 2001
(87) PCT Pub. No.: WO00/02012
PCT Pub. Date: Jan. 13, 2000

(30) Foreign Application Priority Data

Jul. 1, 1998 (IT) .................................. RM98A0435

(51) Int. Cl.$^7$ ............................................. G01C 25/00
(52) U.S. Cl. .................... 73/1.75; 33/502; 33/366.17
(58) Field of Search ............................ 73/1.75; 33/502, 33/366.17

(56) References Cited

U.S. PATENT DOCUMENTS

| 3,583,814 A | * | 6/1971 | Shumway, Jr. ............. 33/377 X |
| 4,554,535 A | * | 11/1985 | Floris et al. ............... 33/366.1 |
| 5,210,954 A | * | 5/1993 | Scafler ........................ 33/366 |

* cited by examiner

Primary Examiner—Thomas P. Noland
(74) Attorney, Agent, or Firm—Browdy and Neimark, P.L.L.C.

(57) ABSTRACT

The present invention relates to a device for checking and calibrating high precision inclinometric sensors. It comprises a substantially quadrangular planar base body made of highly rigid material, set to float on mercury placed inside a tank; a pair of micrometric positioning means of known weights, situated in proximity to concurrent edges of the base body, on the respective axes of symmetry of the base body, able to allow to change the baricentre and the inclination on the mercury of the base body by a value determined by the variation in the applied moment; a pair of screws for adjusting the zero point, situated on said base body and a seat located centrally to the base body for positioning an inclinometric sensor to be calibrated.

3 Claims, 2 Drawing Sheets

DEVICE FOR CHECKING AND CALIBRATING HIGH PRECISION INCLINOMETRIC SENSORS

TECHNICAL FIELD

The present invention relates to a device for checking and calibrating high precision inclinometric sensors. In particular, highly sensitive inclinometric sensors need very precise calibration in order to best exploit their potential resolution capabilities. The potential precision of most instruments is affected by noise caused by the sensor and by the electronics, and thus far the existing calibration devices available on the market have not been able to solve the problem of an optimal calibration.

Inclinometers measure variations in the gradient of the surface whereto they are fixed and are used for checks especially in the industrial, geotechnical and geophysical fields. In the industrial field, these instruments are used to verify various types of alignments and to position instruments with precision, whilst in the geotechnical field they are used to monitor the deformation state whereto particular structures such as foundations, bridges, dams, tunnels are subjected. In the geophysical field they are essentially used to monitor soil deformations associated to possible events of various kinds such as slope instability, tectonic movements, movements of volcanic origin. Inclinometric sensors essentially use as a vertical reference a pendulum or an electrolytic bubble with respect to which they measure inclination variations.

BACKGROUND ART

Nowadays the most widely used inclinometers are those with electronic sensors whose principle is essentially based on the equilibrium position assumed by an electrolytic bubble suspended inside a fluid-filled container. Electronic sensors detect resistance variations measured through the variations in position of the electrolytic bubble with respect to electrodes integral with the container. The sensors are usually set to measure inclinations along two orthogonal axes in order to obtain a spatial representation (module and direction) of the inclination vector. These instruments are generally able to reach high theoretical precision (resolution in the order of 0.1–0.01 microradians), but under ordinary conditions their limit consists of the fact that they are hardly able to exploit this potential. The noise effects induced by the environment are considerable and they mainly pertain to temperature variations that can create noise both in the sensor and in the electronics. A further problem pertains to the linearity of the response by the instrument which is not necessarily maintained along the entire measurement range. These aspects are not always analysed in detail by manufacturers which usually do not provide precise calibration card and the detailed procedures of any calibration tests which may have been conducted.

The laboratory evaluation of the exact noise caused by thermal variations and the verification of the correct instrumental response, in addition to a check of the regular operation of the instrument, would also allow a more adequate evaluation of procedures for filtering "spurious" effects not connected to real variations, thereby fully exploiting the potential of the instrument.

DISCLOSURE OF INVENTION

The aim of the present invention is to eliminate the drawbacks mentioned above, realising a device for checking and calibrating high precision inclinometric sensors that obtains a correct calibration of these instruments with precision of less 0.1 $\mu$/m.

Normal calibration tables available on the market use an adjustment system comprising a micrometer with good mechanical characteristics, but with a resolution that is at least an order of magnitude poorer. The solution of adding to a table of this kind a set of leverages to reduce the travel of the micrometer is unsatisfactory because the system would still be limited by the mechanical couplings, play, friction, etc., which would make it very difficult to drop below a tenth of a micron.

In addition to the mechanical aspects, the fundamental problems with normal calibration tables are:

i) during the calibration time they cannot distinguish possible real effects, i.e. actual gradient changes by induced the real adjustment on the plate, from fictitious effects, i.e. induced by the surrounding environment;

ii) they are also unable to discriminate to what extent thermal variations affect the sensor as noise or may influence possible undesired movements of the plate.

Therefore, in accordance with the present invention, a calibration device has been devised and realised that makes no direct use of mechanical apparatuses to adjust and verify the inclination, but that is based instead on the different inclination that a floating object assumes as its baricentre varies.

The invention, as it is characterised by the claims that follow, solves the problem of providing a device for checking and calibrating high precision inclinometric sensors, which from a general point of view is characterised in that it comprises:

a planar base body of substantially quadrangular shape, made of highly rigid material, set to float on the mercury placed inside a tank;

a pair of micrometric positioning means of known weights, situated in proximity to concurrent edges of the base body, on the respective orthogonal axes of symmetry of the base body, able to allow varying the baricentre and the inclination on the mercury of the base body by a value determined by the variation of the applied moment;

a pair of screws for adjusting the zero point, situated on said base body, in positions respectively opposite to said pair of micrometric positioning means of known weights, such as to be able to act on the axes of symmetry to be positioned within the whole measurement range of the sensor;

a seat situated centrally with respect to the base body for positioning an inclinometric sensor centrally on said axes of symmetry.

Further features and advantages of the invention shall be made more readily apparent from the detailed description that follows, of a preferred embodiment illustrated purely by way of non limiting example in the accompanying drawings.

DESCRIPTION OF THE ILLUSTRATIVE EMBODIMENT

Figure 1:
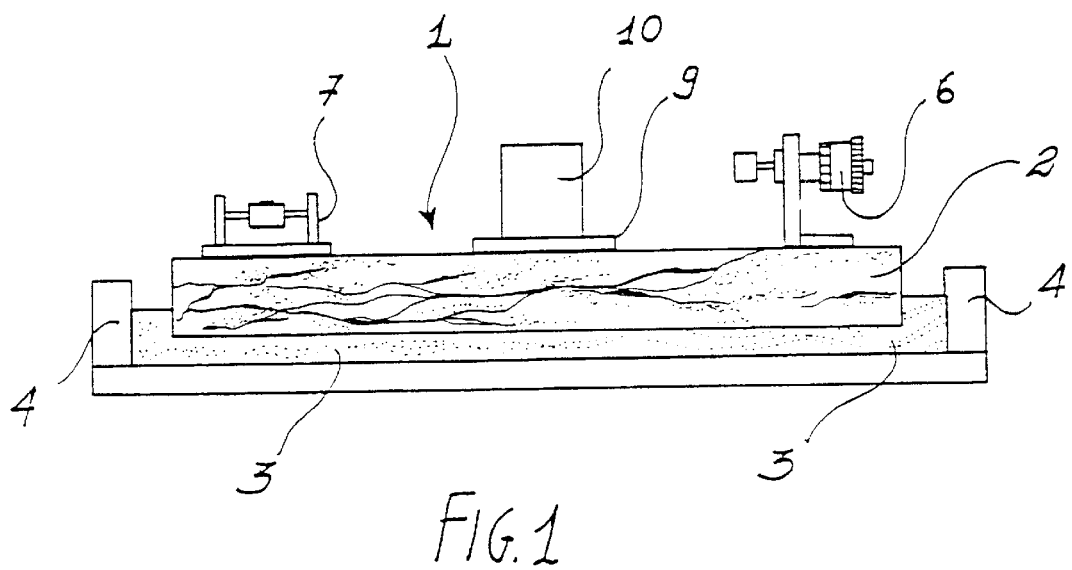
FIG. 1 schematically shows a longitudinal section of the device of the present invention.
Figure 2:
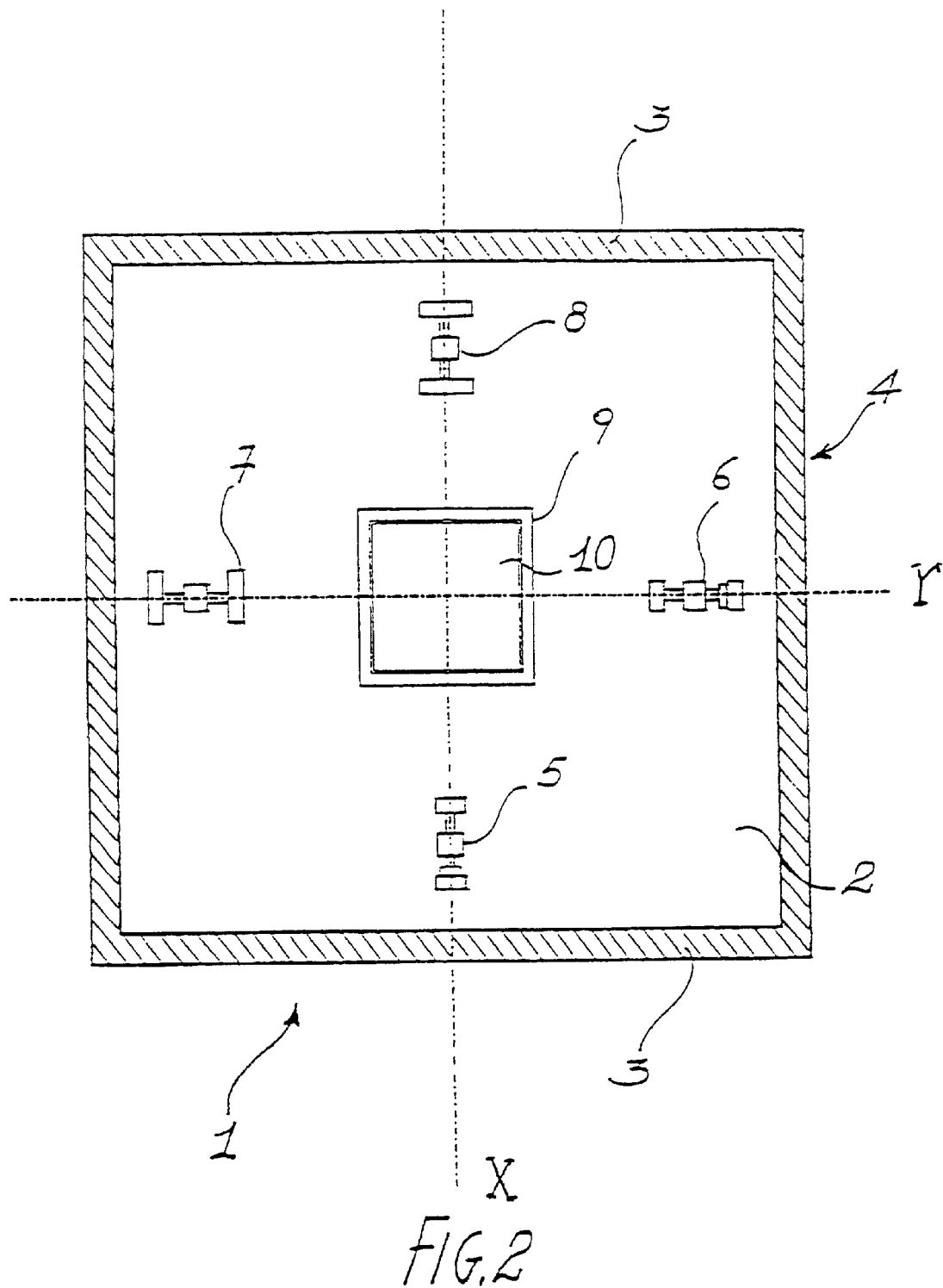
FIG. 2 schematically shows a top view of the device of the present invention.

In accordance with the present invention, in FIGS. 1 and 2 a device for checking and calibrating high precision inclinometric sensors is indicated in its entirety with the number 1.

In particular, the device 1 comprises a base body 2, of substantially quadrangular shape, which floats on mercury 3, provided with attachment fittings for the instrument to be calibrated and the related electronics, not shown in the figures, as well as a pair of micrometric positioning means 5 and 6 of known weights, known in themselves, to allow the base body 2 to vary its baricentre and thus to incline on the mercury by a value determined by the resultant of the applied weights, allowing the fine adjustment of the variation of the baricentre and inclination of the base body 2 on the mercury 3.

The structure of the device 1 comprises, as stated above, a base body 2, made of highly rigid material, preferably granite, at least 30–50 mm thick, floating on mercury contained in a tank 4, for instance made of Perspex, whose approximate dimensions are 800×800×150 mm.

On the edges of the plate, which constitutes the base body 2, positioned on the orthogonal axes of symmetry shown in FIG. 2, fastened in place in proximity to concurrent edges of the base body, is a pair of micrometric positioning means 5 and 6 of known and defined weights, able to allow the fine adjustment of the baricentre variation and of the inclination on the mercury 3 of the base body 2 by a value determined by the variation of the applied moment.

As shown in FIGS. 1 and 2, the device further comprises a pair of screws 7 and 8 for adjusting the zero point, known in themselves, situated on said base body 2 in positions respectively opposite to said pair of means able to act on the axes of symmetry in order to be positioned within the entire measurement range of the sensor.

The number 9 indicates a seat for positioning an inclinometric sensor 10 centrally on said axes of symmetry, situated centrally to the base body 2. The inclinometric sensor 10 to be calibrated is fastened to the centre of the base body 2 with the axes aligned with the micrometers 5, 6, along the two directions of symmetry. Both the micrometer and the adjustment screw allow to balance the masses to read zero on both axes of the inclinometric sensor being tested.

In general, when adjusting one of the two micrometers 5, 6, there is a measured displacement of a known mass wherefrom, as shall be described farther on, one can deduce the inclination of an axis of the base body 2 and hence of the inclinometer with respect to zero. The same operation can be repeated for the other axis. The base body 2 is made to float on mercury which with its considerable specific weight (13.55 g/mL) provides a strong buoyancy thereby causing highly precise inclination adjustments.

Figure 3:
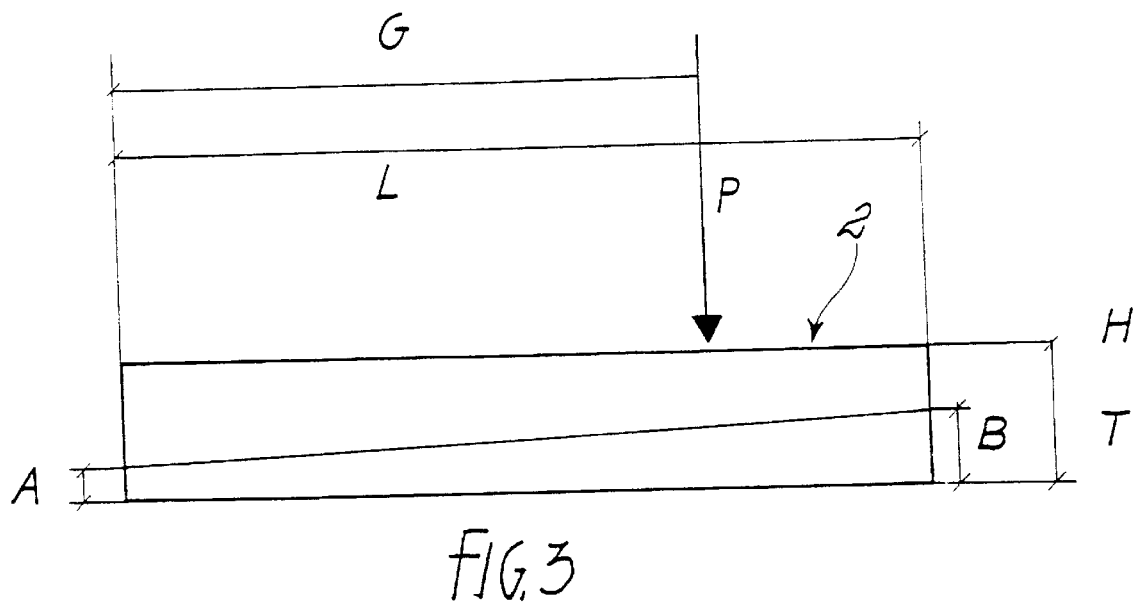
FIG. 3 shows a longitudinal section of the base body.

FIG. 3 schematically shows the section of the floating base body 2 whilst the indicated symbols have the following meaning:

L=Length of base body H=width of base body
T=Thickness P=force of weight
G=point of application of the force assumed to be balanced with respect to H
A and B=variation in the immersion of the base body due to the force of weight
p=density of mercury The relationships between weight force and its point of application with the characteristics and the immersion of the base body 2 can be obtained from the equilibrium of the forces involved, wherefrom:

$$P=HLC$$

Defining:

$$A+B=2C, B-A=2D.$$

whence:

$$A=C-D \quad B=C+D$$

where C represents the mean value of the immersion of the base body 2 due to weight P, whilst D represents the value to be added to or removed from C to obtain the values of the immersion of the base body at the extremes B and A, so that:

$$D = 3 \times \frac{(2CG - C)}{L} \quad (1)$$

$$G = \frac{L}{2C} \times \frac{(D+C)}{3} = \frac{L}{2} + \frac{LD}{6C} = \frac{L}{2} + L^2 H \rho \frac{D}{6P}$$

Considering these relationships that govern the immersion of the base body 2 in the mercury (specific weight 13.55 g/mL) we can thus compute the extent to which we need to adjust a micrometer that displaces an overall weight (for instance set to 100 g) to incline the base body with the aforementioned geometric characteristics (L=H=800 mm, D=4·10−5 mm) with a height difference of 0.1 $\mu$m/m.

From (1), we find that G=400+0.465 mm so that, at the equilibrium situation (D=0 thus G=L/2), the centesimal micrometer with 10 $\mu$m notches needs to be rotated by 46 notches (½ turn).

The same check performed considering density at −20° C. and at +40° C. yields respectively 0.4664 and 0.4607 mm, with a resulting error of roughly half a notch.

In particular in this temperature range there is a 1.23× 10−2 variation between the extremes, which can be corrected for greater inclination values accounting for the density of mercury at the test temperature.

Taking into account that with the micrometer in question the instrumental error is at most the equivalent of 1–2 notches. i.e. 10–20 $\mu$m it follows that under the conditions specified above it is theoretically possible to appreciate variations of about 0.002 microradians. Obviously, in order to be observed such extremely high precision requires a testing laboratory that is free, in the short term, of any environmental noise, however minimal.

The micrometer creates a variation in the moment M0 acting on the base body 2 maintaining a constant action force (weight of the displaced mass) and varying its arm with respect to the baricentre of the base body.

The choice of a floating system for the realisation of the device for calibrating inclinometric sensors, according to the invention, has the advantage of being insensitive to variations in the inclination of the support (for instance the table whereon the device stands), to variations which may be determined by the displacement of loads in the surrounding environment, and to variations induced by the movements (for instance thermo-elastic movements) of the buildings that house the sensors to be calibrated.

Furthermore, the device 1 is not influenced by temperature variation which is the main source of noise in electronic inclinometric sensors. This aspect allows perfectly to discriminate and assess thermal noise, allowing then to best exploit the potential of inclinometric sensors. If no disequilibrium is induced with the weights, i.e. if the base body 2 is allowed to float in an equilibrium position, the system remains perfectly fixed in the horizontal position, not being influenced by external effects such as external movements and temperature variations. By causing forced thermal variations, one can discriminate thermal noise correlating the temperature variations with the fictitious variations induced on the inclinometric sensor.

The device 1 always guarantees the ability of the base body to reach or retain the perfect horizontal position and allows, by recording the signal of the clinometer suitably fastened on the base body, to evaluate possible medium term and long term instrument drift.

In this device some disturbance, albeit negligible, may be introduced by:

a) excessively near ventilation systems which may unbalance the value of the atmospheric pressure acting on the floating base body;

b) magnetic fields;

c) electrostatic fields.

Item a) can be solved simply by means of a cover, also made of perspex, which guarantees air tightness, not shown in the Figures. For item b) it is sufficient to verify that a location has been selected wherein there are no proximate potential sources of magnetic fields, whereas for item c), if problems are noted for instance due to the accumulation of discharges on the cover or on the edges of the tank, it will be sufficient to insert around the device a wide meshed metal net, electrically connected to the mercury.

The invention thus conceived can be subject to numerous modifications and variations, without thereby departing from the scope of the inventive concept according to the claims. Moreover, all components can be replaced with technically equivalent elements.

In practice, modifications and/or enhancements are obviously possible without thereby departing from the scope of the claims that follow.

What is claimed is:

1. Device for checking and calibrating high precision inclinometric sensors, characterised in that it comprises:

a planar base body (2), of substantially quadrangular shape, made of highly rigid material, set to float on mercury (3) inside a tank (4);

a pair of micrometric positioning means (5, 6) of known weights, situated on the concurrent edges of the base body (2), on the respective orthogonal (X, Y) axes of symmetry of the base body; said means (5, 6) determining by horizontal change of the positions of the known weights, a consequent change of the baricentre and the inclination on the mercury of the base body (2);

a pair of adjusting screws (7, 8), situated on the axes of symmetry (X, Y) of the base body 2), in positions respectively opposite to said pair of micrometric positioning means of known weights (5, 6);

a seat (9) situated centrally on the base body (2) for positioning an inclinometric sensor (10) centrally on said axes of symmetry (X, Y) of the base body (2).

2. Device for checking and calibrating high precision inclinometric sensors according to claim 1, characterised in that said seat (9) is provided with attachment fittings for the inclinometric sensor (10) to be calibrated and for the related electronics.

3. Device for checking and calibrating high precision inclinometric sensors according to claim 1, characterised in that the base body (2) is made of granite.

* * * * *